(12) United States Patent
Shapira

(10) Patent No.: US 9,467,195 B2
(45) Date of Patent: Oct. 11, 2016

(54) CONCURRENT DUAL-BAND WLAN DEVICE USING MCM

(71) Applicant: Celeno Communications (Israel) Ltd., Raanana (IL)

(72) Inventor: Nir Shapira, Raanana (IL)

(73) Assignee: CELENO COMMUNICATIONS (ISRAEL) LTD., Ra'anana (IL)

(*) Notice: Subject to any disclaimer, the term of this patent is extended or adjusted under 35 U.S.C. 154(b) by 287 days.

(21) Appl. No.: 14/341,864

(22) Filed: Jul. 28, 2014

(65) Prior Publication Data

US 2016/0029385 A1    Jan. 28, 2016

(51) Int. Cl.

| | |
|---|---|
| *H04B 1/38* | (2015.01) |
| *H04B 1/00* | (2006.01) |
| *H04B 1/401* | (2015.01) |
| *H04B 1/52* | (2015.01) |
| *H04W 84/12* | (2009.01) |
| *H04W 72/00* | (2009.01) |
| *H04W 88/06* | (2009.01) |

(52) U.S. Cl.
CPC ............ *H04B 1/401* (2013.01); *H04W 72/00* (2013.01); *H04W 84/12* (2013.01); *H04W 88/06* (2013.01)

(58) Field of Classification Search
CPC ...... H04W 88/06; H04B 1/005; H04L 27/04; H04L 1/0033
USPC ............ 370/252, 329, 232, 338; 455/553.1, 455/127.4; 375/219
See application file for complete search history.

(56) References Cited

U.S. PATENT DOCUMENTS

| | | | | |
|---|---|---|---|---|
| 6,917,815 B2 * | 7/2005 | Hajimiri | ............... | H04B 1/005 455/285 |
| 7,180,467 B2 * | 2/2007 | Fabrega-Sanchez | ............ | G01R 27/2694 343/861 |
| 8,139,670 B1 | 3/2012 | Son et al. | | |
| 2003/0143971 A1 * | 7/2003 | Hongo | ..................... | H04B 1/38 455/313 |
| 2006/0273854 A1 * | 12/2006 | Suzuki | .................. | H03F 1/3223 330/151 |
| 2006/0281488 A1 * | 12/2006 | Chang | .................. | H04B 1/0082 455/553.1 |
| 2007/0099582 A1 * | 5/2007 | Chen | ..................... | H04B 1/0071 455/76 |
| 2010/0227570 A1 * | 9/2010 | Hendin | .................. | H04B 1/006 455/78 |
| 2010/0242416 A1 * | 9/2010 | Sato | ........................ | B29C 65/18 53/494 |
| 2010/0266240 A1 * | 10/2010 | Krishnamoorthy | ...... | G02B 6/43 385/37 |
| 2012/0250666 A1 * | 10/2012 | Bhukania | ............ | H04L 27/0008 370/338 |
| 2014/0131854 A1 * | 5/2014 | Hawk | ................. | H01L 23/5385 257/737 |

(Continued)

OTHER PUBLICATIONS

Wambacq et al, "A single-package solution for wireless transceivers", Design, Automation and Test in Europe Conference and Exhibition, 5 pages, Dec. 31, 1999.

(Continued)

*Primary Examiner* — Wutchung Chu
(74) *Attorney, Agent, or Firm* — D. Kligler IP Services Ltd.

(57) ABSTRACT

A wireless Local Area Network (WLAN) device includes a first transceiver and a second transceiver. The first transceiver is configured to communicate on a first frequency band, and includes a first Multi-Chip Module (MCM). The first MCM includes a first Radio-Frequency Integrated Circuit (RFIC) for transmitting and receiving on the first frequency band and a first BaseBand Integrated Circuit (BBIC). The second transceiver is configured to communicate on a second frequency band, and includes a second MCM. The second MCM includes a second RFIC for transmitting and receiving on the second frequency band and a second BBIC that is identical to the first BBIC.

15 Claims, 3 Drawing Sheets

(56) References Cited

U.S. PATENT DOCUMENTS

2014/0355532 A1    12/2014  Shapira
2015/0103758 A1*   4/2015   Wang ................ H04W 72/0426
                                                        370/329

OTHER PUBLICATIONS

STLC4420 Dual-band IEEE 802.11a/b/g mobile Wi-Fi solution—Data sheet, 2 pages, Feb. 28, 2006.

Moghe et al, "Design Considerations for Multimode Multiband WLANs", Microwave Journal—frequency matters, 10 pages, Sep. 1, 2002.

PCT Application # PCT/IB2014/063473 International Search Report dated Dec. 11, 2014.

IEEE Standard 802.11ac™—2013, "IEEE Standard for Information technology—Telecommunications and information exchange between systems Local and metropolitan area networks—Specific requirements, Part 11: Wireless LAN Medium Access Control (MAC) and Physical Layer (PHY) Specifications,Amendment 4: Enhancements for Very High Throughput for Operation in Bands below 6 GHz", 425 pages, Dec. 11, 2013.

IEEE Standard 802.11n-2009, "IEEE Standard for Information technology—Local and metropolitan area networks—Specific requirements—Part 11: Wireless LAN Medium Access Control (MAC)and Physical Layer (PHY) Specifications Amendment 5: Enhancements for Higher Throughput", 536 pages, Oct. 29, 2009.

* cited by examiner

CONCURRENT DUAL-BAND WLAN DEVICE USING MCM

FIELD OF THE INVENTION

The present invention relates generally to wireless communication, and particularly to methods and systems for concurrent dual band operation in a Wireless Local Area Network (WLAN) device.

BACKGROUND OF THE INVENTION

A Wireless Local-Area Network (WLAN) typically comprises one or more Access Points (APs) that communicate with stations (STAs). WLAN communication protocols are specified, for example, in the IEEE 802.11 family of standards, such as in the 802.11n-2009 standard entitled "IEEE Standard for Information technology—Local and metropolitan area networks—Specific requirements—Part 11: Wireless LAN Medium Access Control (MAC) and Physical Layer (PHY) Specifications Amendment 5: Enhancements for Higher Throughput," 2009; and in the 802.11ac-2013 standard entitled "IEEE Standard for Information technology—Local and metropolitan area networks—Specific requirements—Part 11: Wireless LAN Medium Access Control (MAC) and Physical Layer (PHY) Specifications Amendment 4: Enhancements for Very High Throughput for Operation in Bands below 6 GHz," 2013, which are incorporated herein by reference. WLANs are also commonly referred to as Wi-Fi networks.

SUMMARY OF THE INVENTION

An embodiment of the present invention that is described herein provides a wireless Local Area Network (WLAN) device including a first transceiver and a second transceiver. The first transceiver is configured to communicate on a first frequency band, and includes a first Multi-Chip Module (MCM). The first MCM includes a first Radio-Frequency Integrated Circuit (RFIC) for transmitting and receiving on the first frequency band, and a first BaseBand Integrated Circuit (BBIC). The second transceiver is configured to communicate on a second frequency band, and includes a second MCM. The second MCM includes a second RFIC for transmitting and receiving on the second frequency band, and a second BBIC that is identical to the first BBIC.

In some embodiments, the first and second RFICs and the first and second BBICs include bond pads, wherein the first RFIC is connected to the first BBIC and the second RFIC is connected to the second BBIC using direct bond wires between the bond pads. The bond pads are positioned such that no two bond wires cross over one another.

In other embodiments, the first and second RFICs each includes multiple transceiver sections whose interfaces are configured to face respective baseband circuits in the first and second BBICs, respectively. In yet other embodiments, the first RFIC includes first transceiver sections, and wherein the second RFIC includes second transceiver sections that correspond respectively to the first transceiver sections of the first RFIC, plus one or more additional transceiver sections.

In an embodiment, the second transceiver sections in the second RFIC have interfaces that are ordered in the same order as corresponding interfaces of the first transceiver sections in the first RFIC, and the additional transceiver sections are laid on one or more edges of the second transceiver sections.

There is additionally provided, in accordance with an embodiment of the present invention, a method including, in a WLAN device, communicating on a first frequency band using a first MCM, and concurrently communicating on a second frequency band using a second MCM. The first MCM includes a first RFIC for transmitting and receiving on the first frequency band and a first BBIC. The second MCM includes a second RFIC for transmitting and receiving on the second frequency band and a second BBIC that is identical to the first BBIC.

There is further provided, in accordance with an embodiment of the present invention, a method including producing first and second transceivers. The first transceiver includes a first MCM including a first RFIC for transmitting and receiving on a first frequency band and a first BBIC. The second transceiver includes a second MCM, which includes a second RFIC for transmitting and receiving on a second frequency band and a second BBIC that is identical to the first BBIC. The first and second transceivers are integrated to produce a concurrent, dual-band communication device.

The present invention will be more fully understood from the following detailed description of the embodiments thereof, taken together with the drawings in which:

DETAILED DESCRIPTION OF EMBODIMENTS

Overview

Embodiments of the present invention that are described herein provide improved methods and systems for Wireless Local Area Network (WLAN) communication. In the disclosed embodiments, a concurrent dual band WLAN device comprises two transceivers. Each transceiver is configured to communicate in a different frequency band, denoted a first band or a second band. In addition each transceiver comprises a Multi-Chip Module (MCM), and a corresponding Radio Frequency (RF) front end (RFFE) which is adapted to the frequency band of the respective MCM.

Each MCM comprises an RF Integrated Circuit (RFIC), which comprises one or more transmit/receive (TX/RX) Radio Frequency (RF) communication chains, and a Baseband Integrated Circuit (BBIC), which performs baseband processing of transmitted and received signals. In some embodiments, the BBIC in the MCM of the first band has a common design and functionality to the BBIC in the MCM of the second band.

Bond pads may act as a physical interface to a chip, for connecting between chips in the MCM. In some embodiments, the RFIC of the first frequency band has a different number of RF chains than the RFIC of the second frequency band, and thus, a different number of interface bond pads. The pads on the BBIC are configured so that either the first or the second RFIC may be connected to the BBIC using direct bond wires. The BBIC and RFIC pads are configured so that no matter which RFIC is connected to the BBIC, there are no crossed bond wires between the RFIC and the BBIC. Typically, each transceiver chain is located in the first RFIC and in the second RFIC, opposite its corresponding circuitry in the BBIC.

Using substantially similar BBICs, and a configuration of bond pads as described above, simplifies and enhances the flexibility of the design and manufacturing processes of WLAN devices operating in concurrent multiple frequency bands.

System Description

Figure 1:
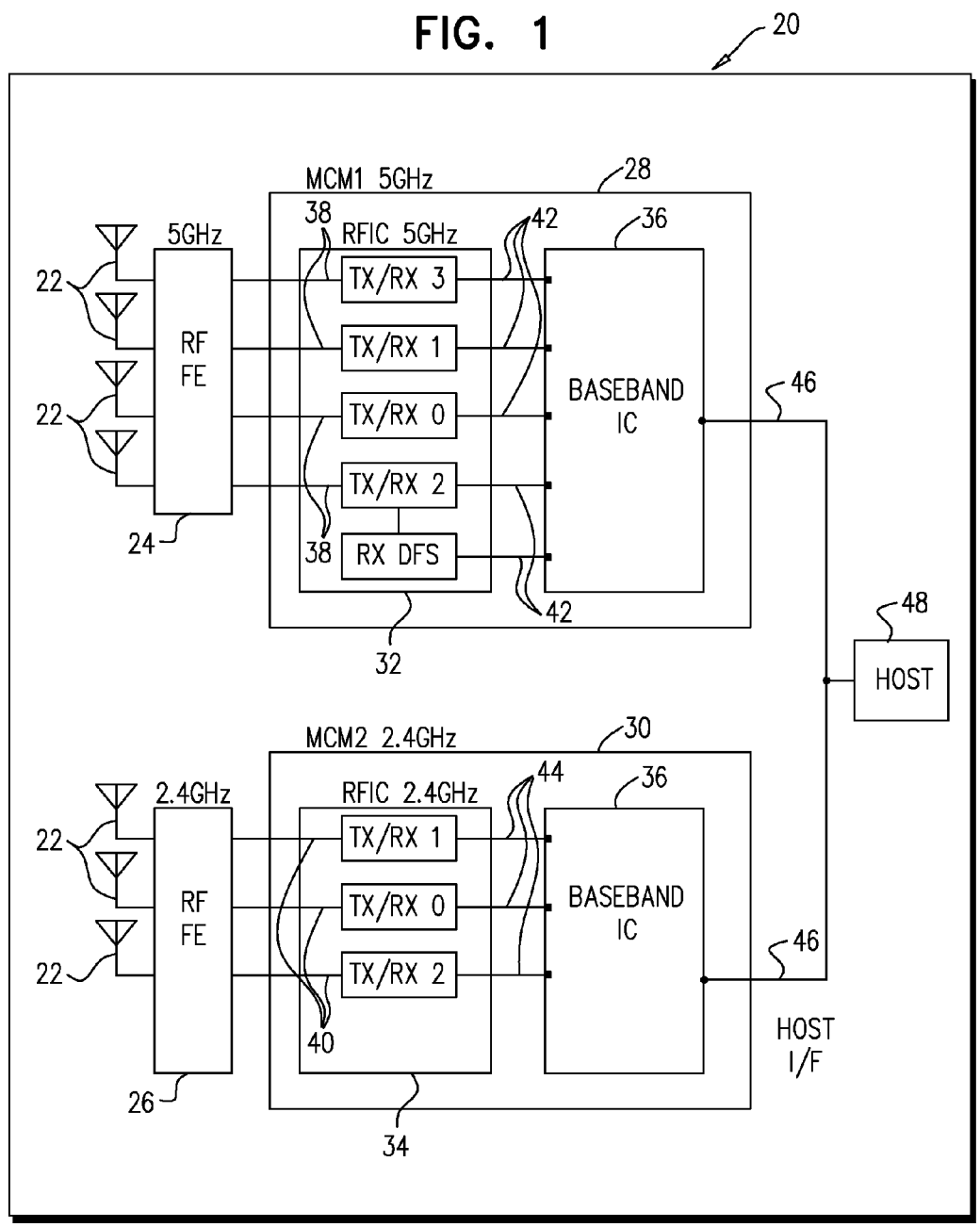
FIG. 1 is a block diagram that schematically illustrates a WLAN device, in accordance with an embodiment of the present invention.

FIG. 1 is a block diagram that schematically illustrates a WLAN device 20, in accordance with an embodiment of the present invention. Device 20 may operate as a WLAN Access Point (AP) or as a WLAN station (STA). Device 20 is configured to communicate with remote WLAN devices in accordance with WLAN standards such as the IEEE 802.11 standards, cited above.

In the present example, device 20 is capable of concurrently transmitting and receiving two frequency bands of WLAN signals, so is also referred to herein as dual-band device 20. Herein, by way of example, the two frequency bands are assumed to be at 2.4 GHz and 5 GHz. Dual-band device 20 comprises a host 48, which is connected via a host interface (I/F) 46 to two Multi-Chip Modules (MCMs). Each MCM operates in one of the two frequency bands. A 5 GHz MCM 28 comprises a BaseBand integrated circuit (BBIC) 36, which is connected via wires 42 to a Radio-Frequency Integrated Circuit (RFIC) 32. BBIC 36 processes signals conveyed to and from RFIC 32, and RFIC 32 transmits and receives signals via four antennas 22.

RFIC 32 comprises four transmit/receive (TX/RX) chains, denoted TX/RX 0-TX/RX 3, which use respective antennas 22. RFIC 32 also has a Dynamic Frequency Selection (DFS) auxiliary receive chain, which comprises a receiver (RX) and which is connected to TX/RX 2 in RFIC 32.

In the 5 GHz frequency band, regulatory requirements, such as are in the IEEE 802.11 family of standards, specify that WLAN device 20 must detect the presence of radar signals and, if detected, switch, when applicable, to a different channel. The DFS auxiliary receive chain is typically used for analyzing signal activity on alternative communication channels. The signal activity evaluation can be used, for example, for identifying alternative channels that device 20 may later choose to switch to, or for collecting statistical activity data. (Throughout the present patent application, the terms "channels," "frequency channels" and "communication channels" are used interchangeably). In the example of FIG. 1, the auxiliary chain shares the antenna and some of the reception hardware of TX/RX2.

Further aspects of WLAN devices having an auxiliary chain are addressed, for example, in U.S. patent application Ser. No. 14/278,117, filed May 15, 2014, which disclosure is incorporated herein by reference.

In some embodiments, the four transmit/receive (TX/RX) chains in MCM 28 are coupled, via wires 38, to four respective front-ends located on an RF front-end (RFFE) 24 communication device. The four front-ends are connected to four respective antennas 22.

Device 20 also comprises a 2.4 GHz MCM 30, which comprises an identical BBIC 36 to the BBIC in MCM 28. In MCM 30 BBIC 36 is connected by wires 44 to an RFIC 34, which is contained in MCM 30 as well.

In the present example, RFIC 34 comprises three transmit/receive (TX/RX) chains, denoted TX/RX 0-TX/RX 2, which (aside from the difference in frequency band) perform similar functions to the respective TX/RX 0-TX/RX 2 in RFIC 32, and located in the same position on the RFIC chip. The three transmit/receive (TX/RX) chains in MCM 30 are coupled, via wires 38, to three respective front-ends (FEs) of the chains, located on RFFE 26, which are connected to three respective antennas 22.

In some embodiments, BBIC 36 devices in MCMs 28 and 30 have a common design, structure and functionality, regardless of the frequency bands in use, while RFICs 32 and 34 have different structure and functionality, according to the respective frequency band of each RFIC.

In each TX/RX chain, the transmit path begins in BBIC 36, which generates a digital BaseBand signal for transmission. The signal is transmitted, via a TX/RX chain and RFFE 24 or RFFE 26, to a respective antenna 22.

In the receive path of each TX/RX chain, antenna 22 receives an analog RF signal. In MCM 28 RFFE 24 switches the signal to a given TX/RX chain in RFIC 32. The chain converts the signal to a digital format, and transmits the digital signal to BBIC 36. MCM 30 has a similar receive path to that of MCM 28.

The configuration of WLAN device 20 shown in FIG. 1 is an example configuration, which is chosen purely for the sake of conceptual clarity. In alternative embodiments, any other suitable device configuration can be used. For example, device 20 may comprise any suitable number of TX/RX chains in either frequency band, or even a single chain. As another example, in FIG. 1 the 5 GHz MCM comprises a DFS auxiliary receive chain, whereas the 2.4 GHz MCM does not. Generally, however, either MCM may or may not comprise a DFS RX chain.

Alternatively, the functionality of the front-ends may be implemented in the RFIC. In another configuration, device 20 may be implemented without an RFIC.

The different elements of device 20 may be implemented using suitable hardware, such as Application-Specific Integrated Circuits (ASICs) or Field-Programmable Gate Arrays (FPGAs). In some embodiments, some elements of device 20, e.g., BBIC 36, can be implemented using software, or using a combination of hardware and software elements. Elements of device 20 that are not mandatory for understanding of the disclosed techniques have been omitted from the figure for the sake of clarity.

In some embodiments, some or all of BBIC 36 and some or all of host 48 may comprise a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory. This processor may be internal or external to the BBIC.

Figure 2:
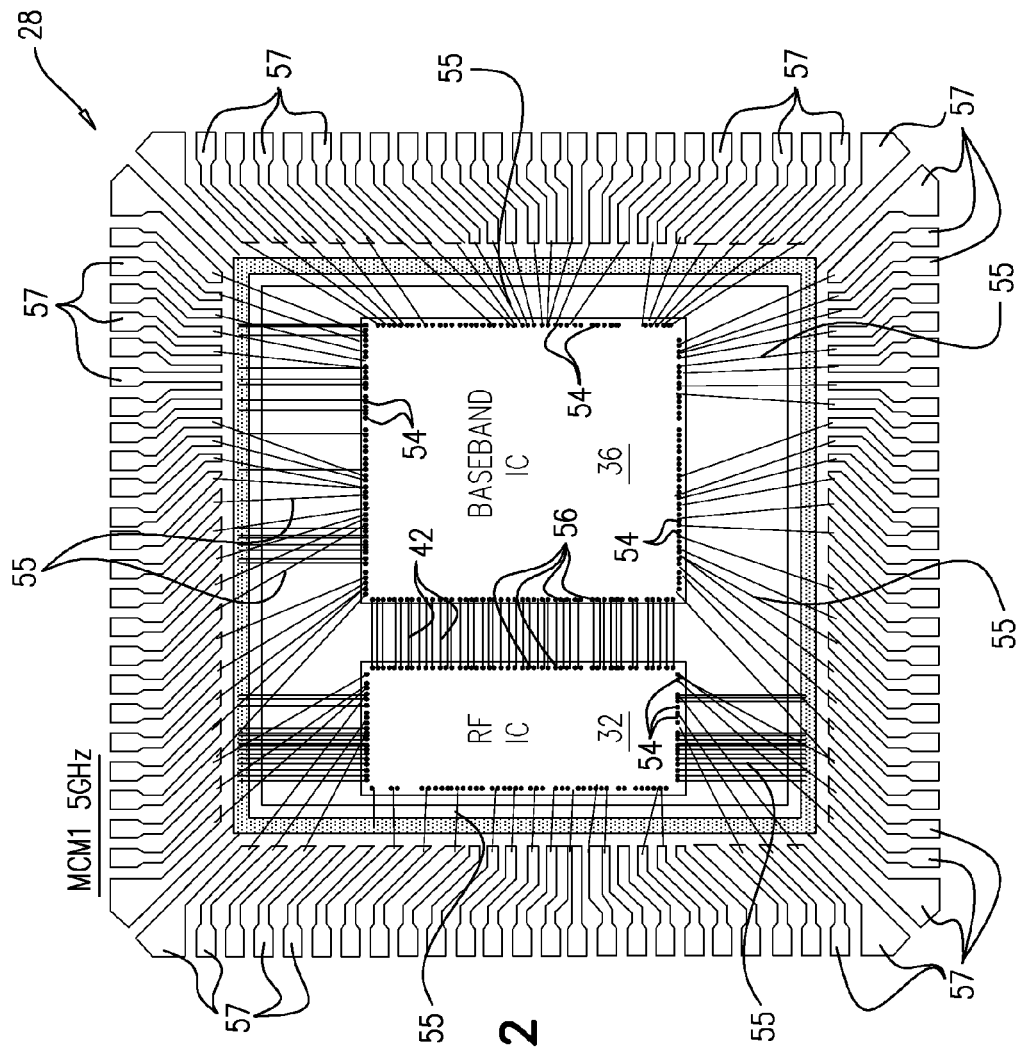
FIG. 2 is a diagram that schematically illustrates a Multi-Chip Module (MCM) package of a WLAN device, in accordance with an embodiment of the present invention.

FIG. 2 is a diagram that schematically illustrates Multi-Chip Module (MCM) 28 of WLAN device 20, in accordance with an embodiment of the present invention.

MCM 28 comprises BBIC 36 and RFIC 32. Each IC comprises bond pads 54, which connect the IC, via wires 55, to pins 57 located in the periphery of the MCM package. Furthermore, each IC comprises pads 56, which connect BBIC 36 and RFIC 32 to each other, by direct bond wires 42.

In some embodiments, the structure of MCM 28, which operates at 5 GHz frequency, corresponds to that for MCM 30, which operates at 2.4 GHz. This correspondence helps to simplify the design and manufacturing processes of similar WLAN devices, including devices using other frequency bands.

Figure 3B:
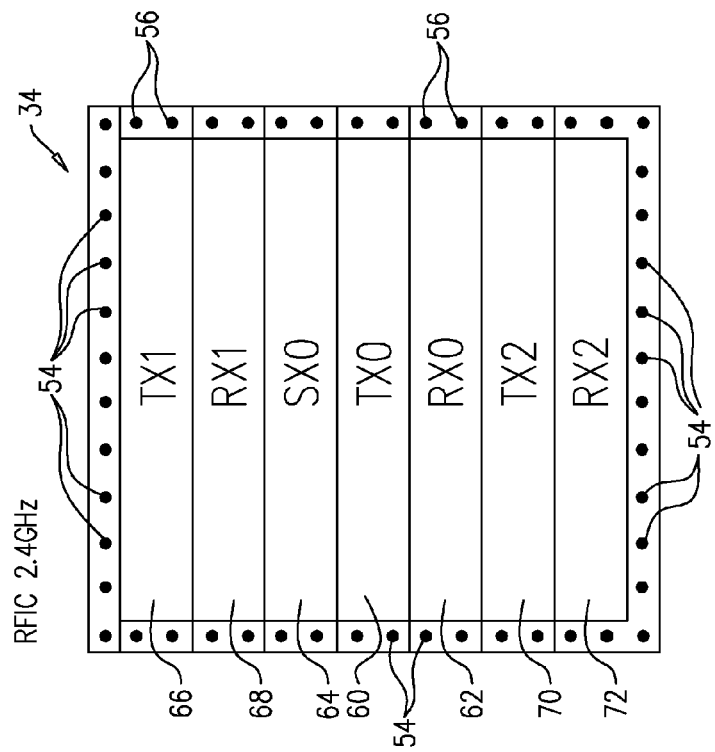
FIGS. 3A and 3B are diagrams that schematically illustrate two Radio Frequency Integrated Circuits (RFICs) of a WLAN device, in accordance with an embodiment of the present invention.
Figure 3A:
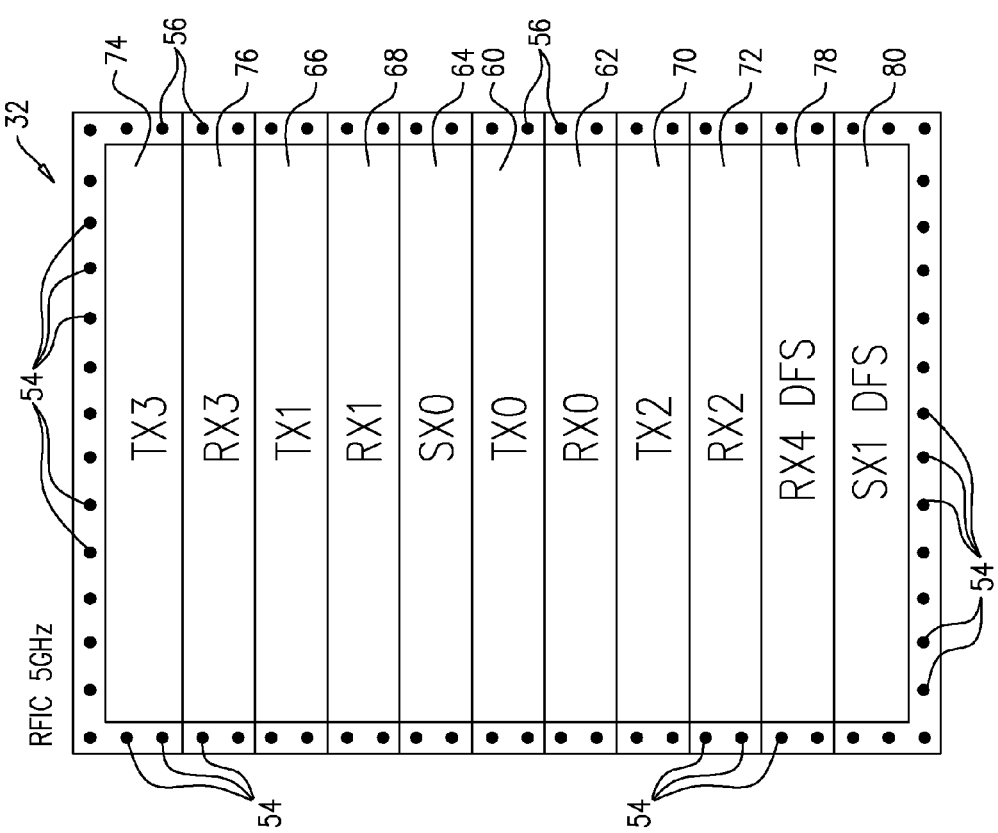

FIG. 3A is a diagram that schematically illustrates the structure of RFIC 32 which is configured to operate at a 5 GHz frequency, in accordance with an embodiment of the present invention.

In this example, RFIC 32 comprises eleven (11) modules. Each module represents a transmit chain, or a receive chain, or a frequency source of the chains. The various modules are also referred to as transceiver sections.

Modules TX0, TX1, TX2, and TX3, are transmit chains, denoted 60, 66, 70, and 74 respectively. The respective receive chains; RX0, RX1, RX2, and RX3, are denoted 62, 68, 72, and 76 respectively.

RX4 DFS 78 is a DFS auxiliary receive chain, which shares the antenna of TX/RX2 in FIG. 1. SX0 64 is a frequency source for TX/RX0-TX/RX3 chains, and SX1 DFS 80 is a frequency source for RX4 DFS 78.

SX0 64 and SX1 DFS 80 are configured to generate Local Oscillator (LO) signals for TX/RX0-TX/RX3, and for RX4 DFS 78, respectively.

FIG. 3B is a diagram that schematically illustrates the structure of RFIC 34, which is configured to operate at a 2.4 GHz frequency, in accordance with an embodiment of the present invention.

RFIC 34 comprises seven (7) modules of transmit/receive chains TX/RX0-TX/RX2. Each module represents a transmit chain, or a receive chain, or a frequency source of the chains.

In some embodiments, the on-chip location of corresponding chains and frequency sources (in this case, the TX/RX0-TX/RX2 chains and the SX0 DFS frequency source), and their respective bond pads 54 and 56, are identical for RFICs 32 and 34. As can be seen from comparing FIGS. 3A and 3B, the modules [TX1, RX1, SX0 ,TX0, RX0, TX2, RX2] are arranged in the same order on RFIC 32 and on RFIC 34. This design commonality enables interchangeability between RFICs 32 and 34 and their respective MCMs 28 and 30. As a result, MCMs 28 and 30 can use an identical BBIC 36, as shown in FIG. 1. In particular, both RFIC 32 and RFIC 34 can be bonded to BBIC 36 using direct bond wires that do not cross over one another.

Commonality in MCM Structures of Concurrent Multiple Band WLAN Devices

In some embodiments, using a common structure and interface of the TX/RX chains at the RFICs, allows formation of multiple-band devices using the same BBIC and similar wiring and packaging schemes in the corresponding MCMs.

The number of RF chains is application specific. In the example of device 20, regulatory requirements for 5 GHz frequency band (e.g., IEEE 802.11 family of standards) specify that WLAN device 20 must detect the presence of radar signals. Accordingly, device 20 can comprise a DFS auxiliary receive chain in RFIC 32. Furthermore, the RFIC may comprise additional transceiver chains, such as TX/RX3 chains. Thus, in the present example, RFIC 32 comprises 11 modules, while RFIC 34 comprises 7 modules.

In some embodiments, there is a different number of transceiver chains in RFIC 32 compared to RFIC 34. However, the common transceiver chains in both RFICs, are lined up identically facing their corresponding circuitry in the BBIC. Thus, RFICs 32 and 34 are interchangeable with each other in relation to the interface with BBIC.

In other embodiments, bond pads 54 and 56 of the RFICs and the BBIC, are configured to avoid crossing wires between the RFIC and the BBIC, in case of switching RFIC 32 with RFIC 34, and vice versa.

In yet other embodiments, RFIC 32 comprises a basic configuration set of transceiver chains (e.g., TX/RX 0-TX/RX 2), which is identical to the configuration of the same set of transceiver chain of RFIC 34. In addition, RFIC 32 comprises one or more additional transceiver sets (or sections), such as TX/RX 3 and/or the RX auxiliary chain, as shown in FIG. 1. The additional transceiver sets (sections) are laid on one or more edges of a contiguous block comprising the basic configuration set of transceiver chains (denoted TX/RX 0-TX/RX 2).

In an embodiment, the layout of the various chains in the RFIC floor plans are not restricted to the configuration illustrated in FIGS. 3A and 3B. The important feature is that the interfaces between the RFIC and the BBIC (pads 56) should be configured at the RFICs and the BBICs as described in FIGS. 3A and 3B, to avoid crossing wires between the RFIC and the BBIC.

In another embodiment, the pads configuration in RFIC 34 are a subset of the pads in RFIC 32. As described above, both RFICs comprise three TX/RX chains (TX/RX 0-TX/RX 2), and their respective pads are at identical locations in the RFIC. RFIC 32 comprises additional groups of pads and the DFS groups, which are not present in RFIC 34.

The configuration presented in FIGS. 3A-3B is an example. In alternative embodiments, any other suitable configuration may be used for the same frequency bands as well as for different frequencies.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A wireless Local Area Network (WLAN) device, comprising:
   a first transceiver, which is configured to communicate on a first frequency band, and which comprises a first Multi-Chip Module (MCM) comprising a first Radio-Frequency Integrated Circuit (RFIC) for transmitting and receiving on the first frequency band and a first BaseBand Integrated Circuit (BBIC); and
   a second transceiver, which is configured to communicate on a second frequency band, and which comprises a second MCM comprising a second RFIC for transmitting and receiving on the second frequency band and a second BBIC that is identical to the first BBIC.

2. The WLAN device according to claim 1, wherein the first and second RFICs and the first and second BBICs comprise bond pads, wherein the first RFIC is connected to the first BBIC and the second RFIC is connected to the second BBIC using direct bond wires between the bond pads, and wherein the bond pads are positioned such that no two bond wires cross over one another.

3. The WLAN device according to claim 1, wherein the first and second RFICs each comprises multiple transceiver sections whose interfaces are configured to face respective baseband circuits in the first and second BBICs, respectively.

4. The WLAN device according to claim 1, wherein the first RFIC comprises first transceiver sections, and wherein the second RFIC comprises second transceiver sections that correspond respectively to the first transceiver sections of the first RFIC, plus one or more additional transceiver sections.

5. The WLAN device according to claim 4, wherein the second transceiver sections in the second RFIC have interfaces that are ordered in the same order as corresponding interfaces of the first transceiver sections in the first RFIC, and wherein the additional transceiver sections are laid on one or more edges of the second transceiver sections.

6. A method, comprising:
in a Wireless Local Area Network (WLAN) device, communicating on a first frequency band, using a first Multi-Chip Module (MCM) comprising a first Radio-Frequency Integrated Circuit (RFIC) for transmitting and receiving on the first frequency band and a first BaseBand Integrated Circuit (BBIC); and
concurrently communicating on a second frequency band, using a second MCM comprising a second RFIC for transmitting and receiving on the second frequency band and a second BBIC that is identical to the first BBIC.

7. The method according to claim 6, wherein the first and second RFICs and the first and second BBICs comprise bond pads, wherein the first RFIC is connected to the first BBIC and the second RFIC is connected to the second BBIC using direct bond wires between the bond pads, and wherein the bond pads are positioned such that no two bond wires cross over one another.

8. The method according to claim 6, wherein the first and second RFICs each comprises multiple transceiver sections whose interfaces are configured to face respective baseband circuits in the first and second BBICs, respectively.

9. The method according to claim 6, wherein the first RFIC comprises first transceiver sections, and wherein the second RFIC comprises second transceiver sections that correspond respectively to the first transceiver sections of the first RFIC, plus one or more additional transceiver sections.

10. The method according to claim 9, wherein the second transceiver sections in the second RFIC have interfaces that are ordered in the same order as corresponding interfaces of the first transceiver sections in the first RFIC, and wherein the additional transceiver sections are laid on one or more edges of the second transceiver sections.

11. A method, comprising:
producing a first transceiver, which comprises a first Multi-Chip Module (MCM) comprising a first Radio-Frequency Integrated Circuit (RFIC) for transmitting and receiving on a first frequency band and a first BaseBand Integrated Circuit (BBIC);
producing a second transceiver, which comprises a second MCM comprising a second RFIC for transmitting and receiving on a second frequency band and a second BBIC that is identical to the first BBIC; and
integrating the first and second transceivers to produce a concurrent, dual-band communication device.

12. The method according to claim 11, wherein the first and second RFICs and the first and second BBICs comprise bond pads for connecting the first RFIC to the first BBIC and the second RFIC to the second BBIC using direct bond wires between the bond pads, wherein the bond pads are positioned such that no two bond wires cross over one another.

13. The method according to claim 11, wherein the first and second RFICs each comprises multiple transceiver sections whose interfaces are configured to face respective baseband circuits in the first and second BBICs, respectively.

14. The method according to claim 11, wherein the first RFIC comprises first transceiver sections, and wherein the second RFIC comprises second transceiver sections that correspond respectively to the first transceiver sections of the first RFIC, plus one or more additional transceiver sections.

15. The method according to claim 14, wherein the second transceiver sections in the second RFIC are laid adjacent to one another in a contiguous block and ordered in the same order as the first transceiver sections in the first RFIC, and wherein the additional transceiver sections are laid on one or more sides of the contiguous block.

* * * * *